United States Patent Office 3,576,713
Patented Apr. 27, 1971

3,576,713
PROCESS FOR DETERMINING IONIC CHARACTER OF A PAPER MASS IN A PAPERMAKING PROCESS
Ewald Fricke, Unterhaching, Germany, assignor to CPC International, Inc.
No Drawing. Continuation-in-part of application Ser. No. 528,825, Feb. 21, 1966. This application July 10, 1969, Ser. No. 840,850
Int. Cl. D21f 11/00, 13/00; D21h 3/80
U.S. Cl. 162—198
10 Claims

ABSTRACT OF THE DISCLOSURE

The present invention covers a relatively simple method of determining the ionic character of starches, wood pulps, paper masses, and paper surfaces. Particularly, it has been found that the ionic character of these materials can be established by mixing them with solutions of suitable organic coloring materials which thereby show changes in the range of visible light in accordance with the ionic character of the materials.

---

This is a continuation-in-part of my copending application Ser. No. 528,825, filed Feb. 21, 1966, and now abandoned.

The present invention deals with a process for determining the ionic character of starches, wood pulps, paper masses and paper surfaces. Also covered is a method for determining the optimum amount of ionic starch to be added to paper masses and the time during the paper making process when such addition will produce a maximum adsorption of the starch.

In the production of paper, additives are often used to give the finished paper specific properties. Among those additives which have a very favorable effect on the property of the paper are starches and modified starches. When using starches and modified starches, however, 100 percent retention, i.e., complete retention of the starches in the finally produced paper during sheet formation on the paper machine, can hardly be achieved.

Recently ionic starches have been used increasingly in paper manufacture since, on account of their chemical structure, they tend to be completely retained in the sheet. Until now the amount of addition of such ionic starches was usually determined either empirically or by observation of the effect of different amounts of ionic starch on papers made with them. Time-consuming trials on the paper machine are required to determine desirable maximum and minimum quantities of ionic starch to add to pulp. These trials are difficult since raw materials available vary extremely, and often the paper manufacturer does not know their chemical and physical nature. Thus, new trials must be run for each batch of raw materials.

The ionic character of a paper raw material can be determined with the aid of physical methods of measurement, such as electrophoresis and electro-osmosis. However, the apparatus needed to apply these methods are expensive and investigations are lengthy, so that the majority of paper manufacturers do not use these methods.

In view of the above, it is an object of this invention to provide a chemical process for qualitatively and quantitatively determining the ionic character of starches, wood pulps, paper masses and paper surfaces.

Another object of the invention is to provide a method for determining the optimum amounts of ionic starches to be added to paper masses during the paper making process.

A further object of the invention is to provide a method for determining the time during the paper making process when added ionic starches will be most completely adsorbed on the pulp.

GENERAL DESCRIPTION OF THE INVENTION

The present invention refers to a relatively simple method of determining the ionic character of starches, wood pulps, paper masses and paper surfaces. Surprisingly, it was found that the ionic character of these only slightly ionic materials can be established by bringing them together with solutions of suitable organic coloring materials which show changes of color in the range of visible light. This allows both qualitative and quantitative conclusions to be drawn as to their ionic character.

Coloring materials are already known, solutions of which when brought together with anionic or cationic substances show different shades of color. However, the ionic characters of starches, wood pulps, paper masses and paper surfaces are so slight that they cannot be recognized by means of the usual coloring materials.

It was found that for the determination of the ionic character of starches, wood pulps, paper masses and paper surfaces phthaleins are especially suited, preferably potassium salts of tetrabromo and tetraiododichlorofluorescein (a) and coloring materials of the triphenylmethane series, preferably chlorides of triamino and chlorides and oxalates of tetramethyltriphenylmethane (b). Through the combined use of suitable coloring materials, preferably those of group (a) with those of group (b), it can be determined immediately in unknown solutions of different substances, whether their behavior is anionic or cationic.

If, for instance, some drops of a diluted solution of the potassium salt of tetraiododichlorofluorescein are added to a solution of cationic starch, a color change from orange-red to blue-red becomes apparent, as compared to a blank test of a solution which does not contain a cationic starch or other ionic materials. If the batch is allowed to stand from about 15 minutes and then acidified with formic acid, the effect becomes particularly clear. The reason for this enhancement is that the molecules of the coloring material, which have not reacted with the cationic starch, react with the formic acid to create a colorless form of the phthalein derivative.

The change of color can also be recognized under an ultraviolet lamp. In the ultraviolet light the non-ionic (blank) solution of the potassium salt of tetraiododichlorofluorescein mentioned above shows a light yellow fluorescence, while in the presence of cationic starches, wood pulps, paper masses and paper surfaces dark red fluorescence occurs. The other preferred coloring materials suggested for use show similar changes of color in the ranges of visible light and ultraviolet light.

The proposed process is suitable for determining quantitatively the optimum amount of addition of ionic starches to pulp during the paper making process to obtain essentially complete adsorption of the starches. The step of the paper making process during which added ionic starches will be most effectively adsorbed by the pulp may also be determined. This is accomplished by taking samples of pulp from the paper making process at different times during the processing. Each pulp sample is mixed with a coloring material and titrated with a solution of an ionic starch until the color of the coloring material indicates that the pulp is essentially non-ionic. For example, if the pulp being titrated is originally anionic, the potassium salt of tetraiododichlorofluorescein can be used as the coloring material and titration with a cationic starch solution can be continued until the color of the coloring material indicates an absence of ionic character.

The ionic character of a material such as a starch, wood pulp, paper mass, or paper surface is quantitatively and qualitatively determined by thoroughly contacting the ionic material with a measured amount of a solution of a suitable coloring material which shows a color change upon contact with the ionic material. A similar but uncharged material is contacted in a like manner with an equal measured amount of a solution of the same suitable coloring matter. Known amounts of charged ions are then added to the uncharged material-coloring material combination until the combination matches the color of the ionic material-coloring material combination.

The contacting can be accomplished, for example, by adding a solution of coloring material to a suspension of the ionic material, or by other convenient means.

For quantitative determination, the charged ions are preferably added as ionic starch solutions containing about 0.5 percent ionic starch. The coloring materials are preferably used in a solution of from 0.001 percent to about 0.5 percent. The percentage figures are percent by weight of the solutions.

This new process provides for the first time, a simple method for determining both qualitatively and quantitatively the ionic characters of starches, wood pulps, paper masses, and paper surfaces. The paper manufacturer can also determine quantitatively the optimum amount of ionic starches to be added to any type of paper mass, and as well find out the best place of addition of the ionic starches, before the paper masses reach the paper making machine. Thereby a practically complete retention of the starches in the paper during sheet formation is assured, and at the same time fine fibers are retained more completely.

The following examples will further illustrate the invention.

EXAMPLE 1

Place of addition of cationic starch

In a paper factory the most favorable place of application of a cationic starch was to be found. This would be a place where the pulp was anionic or at least neutral so that the cationic starch would be best retained. Since other additives were used also, it was essential to determine beforehand through a trial at which place in the production process the starch would have to be added in order to achieve a maximum attachment of the starch to the pulp.

At several places in the production process, samples were taken of the paper mass. One hundred grams of each of these samples were mixed with 1 ml. of a 0.1 percent alcoholic solution of the potassium salt of tetraiododichlorofluorescein. Two of the samples, one of which was taken from the pulper, did not show any change of color to blue-red, i.e., cationic behavior. The cationic starch could be applied usefully only at places where these two samples had been taken. The use of cationic starch in the production of paper from the pulp confirmed the results obtained during the trial.

EXAMPLE 2

Quantitative determination of ionic character

The two samples mentioned in Example 1 were each titrated with a 0.1 percent solution of a cationic starch until a color change of each solution to blue-red occurred.

As the solids content of each of the samples was known, it could be calculated exactly from the starch solution used, how much cationic starch had to be used at the maximum, in order to achieve complete attachment of the starch to the pulp.

In this example, the pulp tested consisted of a mixture of 75 percent sulfite pulp and 25 percent sulfate pulp. From the titration of the sample taken from the pulper, it was determined that a maximum of 0.5 percent cationic starch added to the pulper would produce a non-ionic paper product. When using this amount of cationic starch, no starch could be traced in the screenwater, while with the addition on only 0.6 percent cationic starch to the pulper, excess cationic starch was found in the screenwater.

EXAMPLE 3

Process control and adjustment

Although wood pulps generally show an anionic behavior, this is not always the case in practice.

In a paper factory two pulps A and B which both usually show anionic behavior were used in a ratio of 80:20 to produce a paper mass. Only enough cationic starch was added to the mass so that the waste water was still free of cationic starch. After a time, without any change in the type or amount of raw materials, cationic starch was found in the waste water.

Testing by the process described in Examples 1 and 2, showed that pulp A now showed cationic behavior. The method of application of the cationic starch was then altered so that the cationic starch was first brought together with the anionic pulp B alone. This change resulted in no cationic starch being found in the waste water.

This example shows that the process of the invention is suited for the regular control of operations.

EXAMPLE 4

Titration of colored raw materials

The titration method described in Example 2 can be applied without any difficulties when processing light colored wood pulps and paper masses. However, when processing unbleached or strongly colored raw materials, the point where the color change occurs is often not easily determined. In such a case, the following working method is recommended.

Ten samples (100 grams each) of the paper mass are filled into each of ten beakers. A 0.1 percent alcoholic solution of the potassium salt of tetraiododichlorofluorescein (1 ml.) is added to each beaker. The resulting suspensions are mixed. Then 0.1 percent, on an absolute dry basis, of a 0.1 percent solution of a cationic starch is put into the first beaker, 0.2 percent into the second, and so on, up to 1.0 percent. The batches are put into a row. A determination can then clearly be made as to which batch is still colored orange-red, i.e., has anionic behavior, and which batch shows a bluish tinge, or cationic behavior. The optimum amount of cationic starch to be added then lies between that added to each of these two batches.

EXAMPLE 5

Use of combination of cationic and anionic sensitive coloring materials

A sample of anionic paper pulp was removed from the pulper in a paper factory. A 100 g. sample of the aqueous pulp suspension was mixed with 1 ml. of a 0.005% aqueous solution of a coloring material from the triphenylmethane series, malachite green, and with 1 ml. of a 0.1% alcoholic solution of the potassium salt of tetraiododichlorofluorescein. The resulting slurry was acidified with 1 ml. of a 10% formic acid solution. The paper pulp suspension took on a grayish-blue tinge. That is, the suspension showed an anionic behavior as evidenced by the color of the coloring materials. The slurry was then titrated with a 0.1% solution of cationic starch until the color turned to blue-red due to color changes of the malachite green and the tetraiododichlorofluorescein.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

That which is claimed is:

1. In a paper-making process wherein an ionic starch is to be added to a paper mass at some point in the process stream, the steps of:
   (1) securing several samples of said paper mass at different points in the process stream;
   (2) mixing each of said samples respectively with portions of a solution of a suitable indicator material that has the property of exhibiting different, readily observable colors, depending upon the ionic charge of paper mass sample that is mixed with the portion of the indicator material; and
   (3) adding the ionic starch to the paper mass at a point at which the ionic charge of the paper mass is different from that of the ionic starch.

2. Process in accordance with claim 1 wherein said indicator material is a member selected from the group consisting of salts of tetraiododichlorofluorescein, salts of tetrabromodichlorofluorescein, malechite green, and mixtures thereof.

3. Process in accordance with claim 2 wherein said indicator material is the potassium salt of tetraiododichlorofluorescein.

4. Process in accordance with claim 1 wherein the ionic starch is a cationic starch and wherein the paper mass at the point at which the cationic starch is added is non-ionic.

5. Process in accordance with claim 1 wherein the ionic starch is a cationic starch and wherein the paper mass at the point at which the cationic starch is added is anionic.

6. In a paper-making process wherein an ionic starch is to be added to the paper mass at some point in the process stream, the steps of:
   (1) securing a sample of known weight of said paper mass from a point in the process stream, the ionic character of said sample being different from that of the ionic starch to be added to the process stream;
   (2) titrating said sample against said ionic starch, in the presence of a suitable indicator material, which indicator material has the property of exhibiting different, readily observable colors depending upon the ionic charge of the paper mass sample that is mixed with the portion of the indicator material, the titration being conducted until the ionic end point, at which an observable color change in the coloring material takes place, is reached; and
   (3) adding, at the point in the process stream from whence the sample was obtained, the maximum amount of ionic starch which will be retained by the paper mass at that point.

7. Process in accordance with claim 6 wherein said indicator material is a member selected from the group consisting of salts of tetraiododichlorofluorescein, salts of tetrabromodichlorofluorescein, malachite green, and mixtures thereof.

8. Process in accordance with claim 7 wherein said indicator material is the potassium salt of tetraiododichlorofluorescein.

9. Process in accordance with claim 6 wherein the ionic starch is a cationic starch and wherein the paper mass at the point at which the cationic starch is added is non-ionic.

10. Process in accordance with claim 6 wherein the ionic starch is a cationic starch and wherein the paper mass at the point at which the cationic starch is added is anionic.

References Cited

UNITED STATES PATENTS

| | | | |
|---|---|---|---|
| 1,863,813 | 6/1932 | Alden et al. | 162—162X |
| 2,471,861 | 5/1949 | Cahn | 23—230 |
| 2,599,697 | 6/1952 | Conklin | 23—230 |
| 2,927,041 | 3/1960 | Davis | 260—391X |
| 2,979,468 | 4/1961 | Auerbach et al. | 23—230X |
| 2,980,696 | 4/1961 | Korbl | 252—408X |
| 3,257,394 | 4/1966 | Cohen | 162—162 |
| 3,346,563 | 10/1967 | Shildneck et al. | 162—175X |

OTHER REFERENCES

Speel et al.: "Textile Chemicals and Auxiliaries"; 2nd ed.; 1957, Reinhold; New York; p. 266.

Kay et al., "Rapid Photometric Determination of Dialdehyde Starch in Paper," Tappi, December 1962, vol. 45, No. 12; pp. 943, 944; 162–175.

Kress et al.; "Study of Dyestuff Absorption by Fillers and Their Effect Upon Color of Filled Paper," Paper Trade Journal, vol. 117, No. 10, pp. 109 and 113.

S. LEON BASHORE, Primary Examiner

F. FREI, Assistant Examiner

U.S. Cl. X.R.

23—230; 162—49, 162